(12) United States Patent
Mossoba et al.

(10) Patent No.: US 12,314,962 B2
(45) Date of Patent: *May 27, 2025

(54) SYSTEMS AND METHODS OF PHOTO-BASED FRAUD PROTECTION

(71) Applicant: Capital One Services, LLC, McLean, VA (US)

(72) Inventors: Michael Mossoba, Great Falls, VA (US); Joshua Edwards, Philadelphia, PA (US); Sarah Cunningham, Arlington, VA (US); Mark Rothbaum, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,922

(22) Filed: Dec. 18, 2023

(65) Prior Publication Data

US 2024/0119467 A1 Apr. 11, 2024

Related U.S. Application Data

(63) Continuation of application No. 17/090,012, filed on Nov. 5, 2020, now Pat. No. 11,847,662, which is a
(Continued)

(51) Int. Cl.
*G06Q 30/018* (2023.01)
*G06F 16/903* (2019.01)
(Continued)

(52) U.S. Cl.
CPC ... *G06Q 30/0185* (2013.01); *G06F 16/90335* (2019.01); *G06V 30/413* (2022.01); *G06V 30/10* (2022.01)

(58) Field of Classification Search
None
See application file for complete search history.

(56) References Cited

U.S. PATENT DOCUMENTS 6,779,021 B1 * 8/2004 Bates ............... G06Q 10/107
709/206
8,458,199 B2 6/2013 Garey
(Continued)

OTHER PUBLICATIONS

Insky, Ephraim, "What is Machine Learning and How Can It Be Used to Detect Fraud?" [online] Riskified blog, published on Jun. 14, 2017, available at: <riskified.com/blog/what-is-machine-learning-and-how-can-it-detect-fraud/ > (Year: 2017).*
(Continued)

*Primary Examiner* — Richard W. Crandall
(74) *Attorney, Agent, or Firm* — Foley & Lardner LLP

(57) ABSTRACT

A computer-implemented method of fraud protection is described. A server may receive one or more keywords and a likelihood of fraud from an external source. The server may receive an image of a document from a user device, wherein the document comprises at least one of a written communication or a printed communication. The server may extract text from the image of the document, compare the extracted text to the one or more stored keywords, and calculate a confidence level of fraud. The server may send an indication of the confidence level of fraud to the user device.

20 Claims, 7 Drawing Sheets

Related U.S. Application Data continuation of application No. 15/910,330, filed on Mar. 2, 2018, now Pat. No. 10,861,025.

(51) Int. Cl.
*G06V 30/413* (2022.01)
*G06V 30/10* (2022.01)

(56) References Cited

U.S. PATENT DOCUMENTS

| | | | |
|---|---|---|---|
| 8,880,611 B1 | 11/2014 | Lim et al. | |
| 2005/0086224 A1 | 4/2005 | Franciosa et al. | |
| 2005/0091524 A1 | 4/2005 | Abe et al. | |
| 2006/0015561 A1 | 1/2006 | Murphy et al. | |
| 2006/0098874 A1 | 5/2006 | Lev | |
| 2006/0190732 A1 | 8/2006 | Fery et al. | |
| 2008/0183329 A1* | 7/2008 | Gilham | G07B 17/00508 700/224 |
| 2008/0192978 A1* | 8/2008 | Rundle | G06V 30/1448 382/101 |
| 2009/0089279 A1 | 4/2009 | Jeong et al. | |
| 2010/0186088 A1 | 7/2010 | Banerjee et al. | |
| 2012/0120745 A1 | 5/2012 | Miyano et al. | |
| 2012/0150745 A1 | 6/2012 | Csulits et al. | |
| 2016/0344770 A1 | 11/2016 | Verma et al. | |
| 2017/0186032 A1* | 6/2017 | Rangasamy Kannadasan | G06Q 30/0248 |
| 2018/0278627 A1 | 9/2018 | Goutal | |
| 2019/0052655 A1 | 2/2019 | Benishti | |
| 2019/0272549 A1 | 9/2019 | Mossoba et al. | |

OTHER PUBLICATIONS

OCR | ICR Recognition Software 101, available at: <https://www.parascript.com/blog/ocr-icr-recognition-software-101/> published on May 4, 2017 (Year: 2017).*

Tepper, "The Post Office Will Now Email You Photos of Your Mail Before It's Delivered", TechCrunch.com, https://techcrunch.com/2017/03/31/the-post-office-will-now-email-you-photos-of-your-mail-before-its-delivered/, Mar. 31, 2017.

Rath, "USPS Leverages Big Data to Fight Fraud", Data Center Knowledge, https://www.datacenterknowledge.com/archives/2013/05/01/usps-leverages-big-data-to-fight-fraud, May 1, 2013.

DOJ, "Be Alert: Fictious Names", https://www.justice.gov/civil/consumer-protection-branch/mass-mailing-fraud/fictitious-list, Mar. 12, 2017.

Sheehan, "Optical Character Recognition", https://web.archive.org/web/1999100623005/http://www.bcf.usc.edu/~comm533/OCT-SHEE.htm, 1999.

Fawcett, et al., "Combining Data Minding and Machine Learning for Effective User Profiling", KDD-96 Proceedings, https://www.aaai.org/Papers/KDD/1996/KDD96-002.pdf, 1996.

Ghosh, et al., "Credit Card Fraud Detection with a Neural Network", Proceedings of the Twenty-Seventh Annual Hawaii International Conference on System Sciences, 1994.

Pang, et al., "Feature Vectors", Brilliant.com, https://web.archive.org/web/20170920055356/https://brilliant.org/wiki/feature-vector/, 2017.

Rinsky, "What is Machine Learning and How Can It Be Used to Detect Fraud?," Riskified blog, https://www.riskified.com/blog/what-is-machine-learning-and-how-can-it-detect-fraud/, Jun. 14, 2017, 7 pages.

* cited by examiner

SYSTEMS AND METHODS OF PHOTO-BASED FRAUD PROTECTION

CROSS-REFERENCE TO RELATED APPLICATION INFORMATION

This is a continuation of U.S. patent application Ser. No. 17/090,012, filed Nov. 5, 2020, which is a continuation of U.S. patent application Ser. No. 15/910,330, filed Mar. 2, 2018, now U.S. Pat. No. 10,861,025, issued Dec. 8, 2020, which are incorporated herein by reference in their entireties.

FIELD

The present disclosure generally relates to fraud protection technology.

BACKGROUND

Because of the fast development of information technology, financial transactions can take place with high efficiency at any time in any place. However, this technology advancement has also been exploited for fraudulent purposes. Particularly, fraudulent mails and emails can deceive people into thinking they are from legitimate sources and performing a financial transaction following their instructions. Therefore, there is a need for a system and a method of fraud protection.

SUMMARY

In one aspect, the present disclosure describes a computer-implemented method of fraud protection. The method may include: receiving, by a server, one or more keywords and a likelihood of fraud associated with the one or more keywords from an external source of fraud information; storing the one or more keywords and the likelihood of fraud in a database; receiving, by the server, an image of a document from a user device, wherein the document may include at least one of a written communication or a printed communication, the image being captured by an image capturing device associated with the user device; extracting, using an image processing technique, text from the image of the document; comparing the extracted text to the one or more stored keywords; calculating a confidence level of fraud based on comparing the extracted text to the one or more keywords and the likelihood of fraud associated with the one or more keywords; and sending an indication of the confidence level of fraud to the user device.

In some embodiments, the external source of fraud information may include at least one of a financial institution, a government agency, or a law enforcement agency. In some embodiments, the external source of fraud information may include at least one of an administrator of the server or an authorized user of the server.

In some embodiments, the method may include: receiving one or more reports of potential fraud from one or more users; and updating the one or more keywords and the likelihood of fraud associated with the one or more keywords based on the received one or more reports.

In some embodiments, the image of the document may be obtained from an electronic message extracted from an electronic messaging account associated with a user. In some embodiments, the image processing technique may include optical character recognition.

In some embodiments, the method may include: storing one or more image samples in the database; comparing a portion of the image of the document to the one or more image samples stored in the database; and updating the confidence level of fraud based on comparing the portion of the image of the document to the one or more image samples. In some embodiments, the one or more image samples may include at least one of a logo, a trademark, or a signature.

In some embodiments, the method may include: obtaining a name of a sender from the extracted text; receiving a first group of contact information associated with the name of the sender from an external source, wherein the first group of contact information may include at least one of a postal address, a physical address, a phone number, or an email address; obtaining a second group of contact information of the sender from the extracted text, wherein the second group of contact information may include at least one of a postal address, a physical address, a phone number, or an email address; comparing the second group of contact information to the first group of contact information; and updating the confidence level of fraud based on comparing the second group of contact information to the first group of contact information.

In one aspect, the present disclosure describes a computer-implemented method of fraud protection, The method may include: obtaining an image of a physical document, wherein the document may include at least one of a written communication or a printed communication; sending the image of the document to a server, wherein the server is configured to store one or more keywords and a likelihood of fraud associated with the one or more keywords, extract text from the image of the document, compare the extracted text to the one or more keywords, and calculate a confidence level of fraud based on comparing the extracted text to the one or more keywords and the likelihood of fraud associated with the one or more keywords; receiving an indication of the confidence level of fraud from the server; and outputting a notification in a user interface if the confidence level of fraud exceeds a threshold value. In some embodiments, the threshold value is between 50% and 100%.

In some embodiments, the image of the document may be obtained from an image capturing device associated with a user device. In some embodiments, obtaining the image of the document may include receiving an image file from a user. In some embodiments, the image may be obtained from an electronic message extracted from an electronic messaging account associated with a user.

In some embodiments, the user device may include at least one of a mobile device, a computer, a home appliance, or a home assistant device.

In one aspect, the present disclosure describes a system of fraud protection. The system may include: a memory; and a processor circuit coupled to the memory and configured to execute instructions causing the processor circuit to: receive an image of a document from a user device, wherein the document may include at least one of a written communication, a printed communication, or an electronic message; extract at least one of text and graphics from the image of the document; compare the extracted text or graphics to one or more indicia in a database of indicia associated with a likelihood of fraud; calculate a confidence level of fraud based on the comparison and the likelihood of fraud associated with the one or more indicia; and send an indication of the confidence level of fraud to the user device.

In some embodiments, the one or more indicia and the likelihood of fraud are received from at least one of a financial institution, a government agency, or a law enforcement agency. In some embodiments, the one or more indicia may include one or more image samples, and the instructions may further cause the processor circuit to: store the one or more image samples in the database; compare a portion of the image of the document to the one or more image samples stored in the database; and update the confidence level of fraud based on comparing the portion of the image of the document to the one or more image samples.

In some embodiments, the one or more image samples may include at least one of a logo, a trademark, or a signature.

BRIEF DESCRIPTION OF THE DRAWINGS

To assist those of skill in the art in making and using a system of fraud protection and associated methods, reference is made to the accompanying figures. The accompanying figures, which are incorporated in and constitute a part of this specification, illustrate one or more embodiments of the invention and, together with the description, help to explain the invention. Illustrative embodiments are shown by way of example in the accompanying drawings and should not be considered as limiting.

DETAILED DESCRIPTION

Because of the fast development of information technology, financial transactions can take place with high efficiency at any time in any place. However, this technology advancement has also been exploited for fraudulent purposes. Particularly, fraudulent mails and emails can deceive people into thinking they are from legitimate sources and performing a financial transaction following their instructions. Therefore, there is a need for a system and a method of fraud protection. The present disclosure described systems and methods to protect a user from a potential fraud.

As used herein, "fraud" refers to any fraudulent scheme to deceive another person into performing a financial transaction or to deprive the person of property via physical or electronic communication. Examples of frauds can include charity fraud, credit card fraud, insurance fraud, investment fraud, etc.

Figure 1:
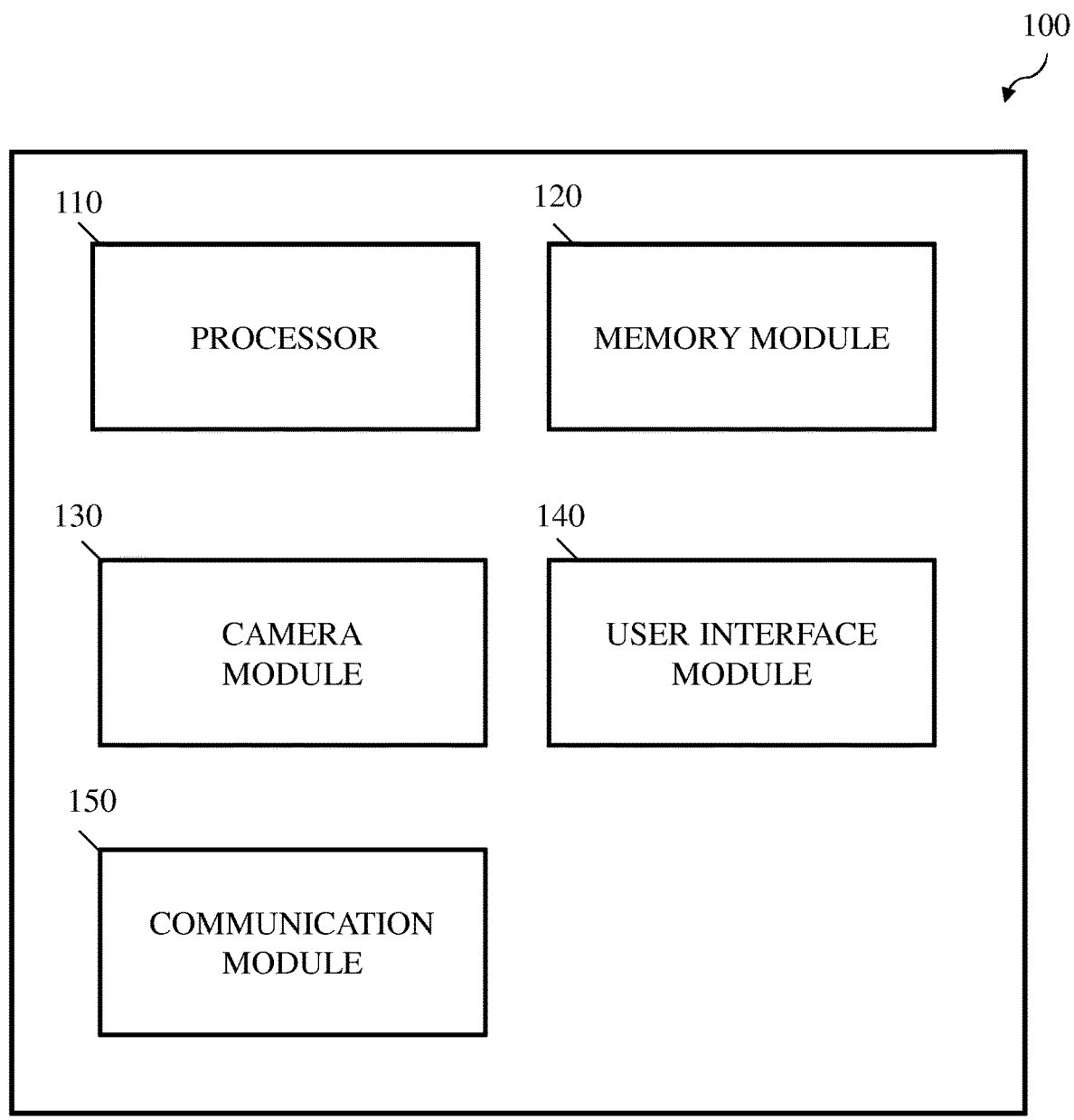
FIG. 1 is a block diagram showing different modules within a user device, according to some embodiments of the present disclosure.

FIG. 1 is a block diagram showing a user device 100, according to some embodiments of the present disclosure. The user device 100 may include different kinds of devices, such as a mobile device, a computer, a home assistant device, an image scanner, a camera, etc. In some embodiments, the user device 100 may include a processor 110, a memory module 120, a camera module 130, a user interface module 140, and a communication module 150.

The user device 100 may include a configurable and/or programmable processor 110 and, and optionally, one or more additional configurable and/or programmable processor(s) 110 (for example, in the case of systems having multiple processors), for executing computer-readable and computer-executable instructions or software stored in memory module 120 and other programs for controlling system hardware. In some embodiments, processor 110 may include a general purpose computer processor. In some embodiments, processor 110 may include a low-power processor designed for a mobile application. In some embodiments, processor 110 may include other types of processors, or a combination thereof.

Memory module 120 may include a computer system memory or random access memory, such as DRAM, SRAM, EDO RAM, and the like. Memory module 120 may include other types of memory as well, or combinations thereof.

Camera module 130 may include one or more image capturing devices, such as a camera, for example. Camera module 130 may be configured to capture still and/or moving images. In some embodiments, the camera module 130 may include a camera array with any number of cameras operating in tandem.

User interface module 140 may include different forms of user interfaces depending on specific needs of different embodiments. In some embodiments, user interface module 140 may include one or more displays, such as a liquid crystal display (LCD), to show device status and information to a user. In some embodiments, user interface 140 may include one or more touch screens to receive a user's input. In some embodiments, user interface 140 may include one or more buttons to receive a user's input. In some embodiments, user interface module may include a microphone and/or speaker for receiving audible inputs and providing audible outputs, including notifications and other information.

Communication module 150 may include different components depending on specific needs of different embodiments. In some embodiments, the communication module 150 may include one or more local area network (LAN) interface. In some embodiments, the communication module 150 may include one or more wide area network (WAN) interface. In some embodiments, the communication module 150 may include one or more cellular communication interfaces, such as a 4G Long-Term Evolution (LTE) interface. In some embodiments, the communication module 150 may include a Wi-Fi interface configured to connect and communicate with a Wi-Fi network. In some embodiments, the communication module 150 may include a Bluetooth® interface. In some embodiments, the communication module 150 may include other types of communication components as well, or combination thereof.

Figure 2:
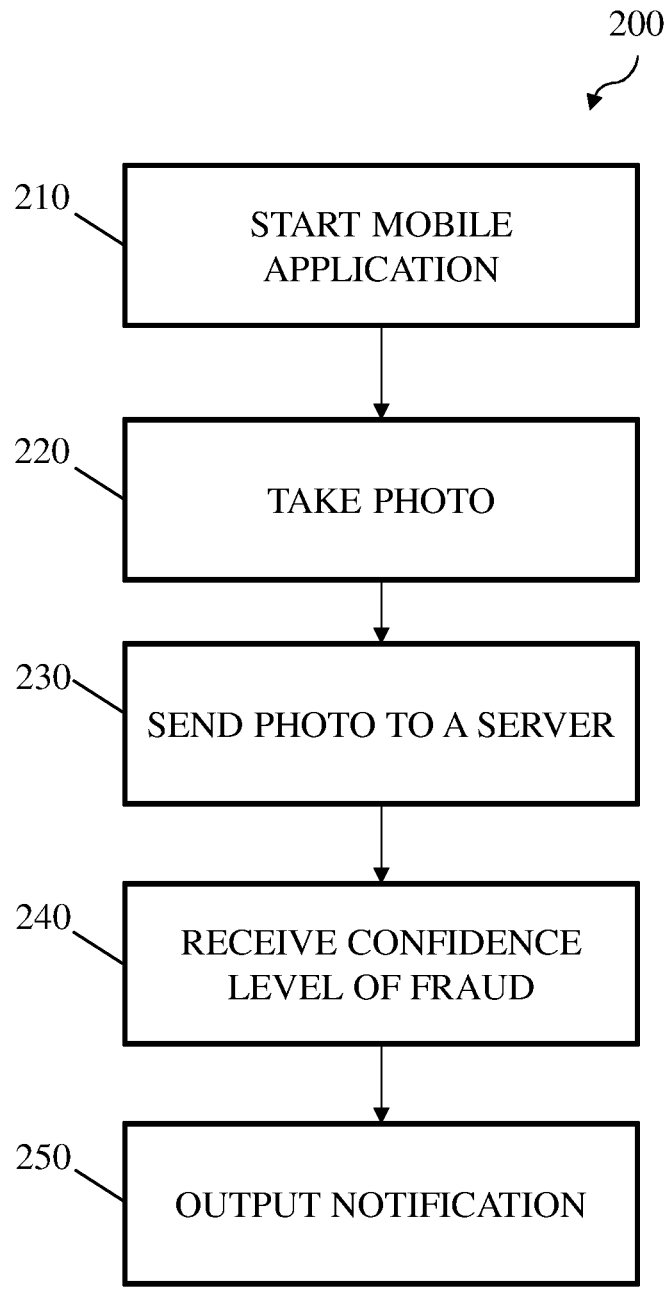
FIG. 2 is a flowchart showing a method of fraud protection with a user device, according to some embodiments of the present disclosure.

FIG. 2 is a flowchart showing a method of fraud protection 200 with a user device 100 such as a mobile device, according to some embodiments of the present disclosure. At step 210, a mobile application on the mobile device 100 may be executed or activated. In some embodiments, user device 100 may be configured to receive a user input to execute the mobile application. In some embodiments, the mobile application may be a fraud protection application or a mobile banking application, such as a Capital One® mobile application, or any type of application including a fraud protection function. For example, in some embodiments, user device 100 may be configured to activate a fraud protection function within the mobile application. In some embodiments, the mobile application may be a photo application configured to capture digital pictures or images (still or moving). In some embodiments, such as when user device 100 is a home assistant, step 210 may include activating an image capture function directly or indirectly, such as by recognizing user speech spoken into a microphone of the home assistant.

At step 220, user device 100 may capture, using the camera module 130, one or more pictures of a physical communication, such as a written communication or a printed communication (e.g., a piece of mail) In some embodiments, if the user uses a mobile banking application with a fraud protection function, the mobile application may be configured to direct the user or provide instructions to the user to take pictures of every page of a received piece of mail, including the envelope. In some embodiments, the mobile application may be configured to provide instructions to the user to take one or more pictures of a screen of a user device showing an electronic message (e.g., an email) in question. In some embodiments, if a photography application such as a native camera application of the mobile device is used, the digital pictures or images (still or moving) may be saved on the mobile device for later upload. In some embodiments, the mobile application may be configured to take a screen shot while an email in question is displayed on the mobile device 100.

In some embodiments, an image capturing device connected to a computer may be used to take one or more pictures of the mail or the email in question. For example, a camera in a laptop computer may be used. In some embodiments, a home assistant device may include a camera which may be used to take pictures of the mail or the email in question. In some embodiments, an image scanning device may be configured to capture images of physical mail. In some embodiments, an image scanning device may be associated with a mail or communication provider. For example, the image scanning device may be configured to provide the user with captured images in an electronic communication (e.g., an email) and the images may be extracted from the electronic communication.

At step 230, user device 100 may be configured to send the one or more pictures of the mail or the email to a server. In some embodiments, the mobile banking application may be configured to automatically communicate with a server and transmit the pictures of the mail and/or the email to the server. In some embodiments, the mobile banking application may be configured to first ask the user to select one or more pictures stored on the mobile device and then transmit the pictures to the server.

At step 240, user device 100 may be configured to receive a calculated confidence level of fraud from the server. In some embodiments, the confidence level of fraud may be between 0% and 100%. For example, the server may determine a confidence level of fraud of the mail to be 70%.

At step 250, user device 100 may be configured to output a notification via the user interface module 140 based on the received confidence level of fraud. In some embodiments, a message may be shown to the user on the display of the mobile device or otherwise announced or provided to the user. For example, the message may be "Alert! The mail is 80% likely to be a fraud." The message may also be "Don't worry. The mail is not likely to be a fraud." In some embodiments, the message may include additional details concerning the subject of the mail or the sender of the mail.

In some embodiments, the message may include a link or option enabling a user to learn more information concerning the subject of the mail. For example, the message may include an indication as to whether a particular mail item has been previously received by the server etc. and any other prior results or determinations made by the server or crowdsourced from other users of the platform.

In some embodiments, even if it is determined that the received mail or email is not fraudulent, the system may provide the user with recommendations related to the claimed matter via user device 100. For example, the received mail or email may be a solicitation for an extended vehicle warranty. Based on crowdsourced inputs from other users or information obtained from an external source (e.g., the Internet), the system may send a message to user device 100 suggesting the user not to purchase the extended warranty and/or provide the user with known complaints about the warranty. In another example, if the received mail or email is a marketing mail for a refinance loan, the system may give the user a recommendation of a comparable or better product from another entity (e.g., Capital One®.)

Figure 3:
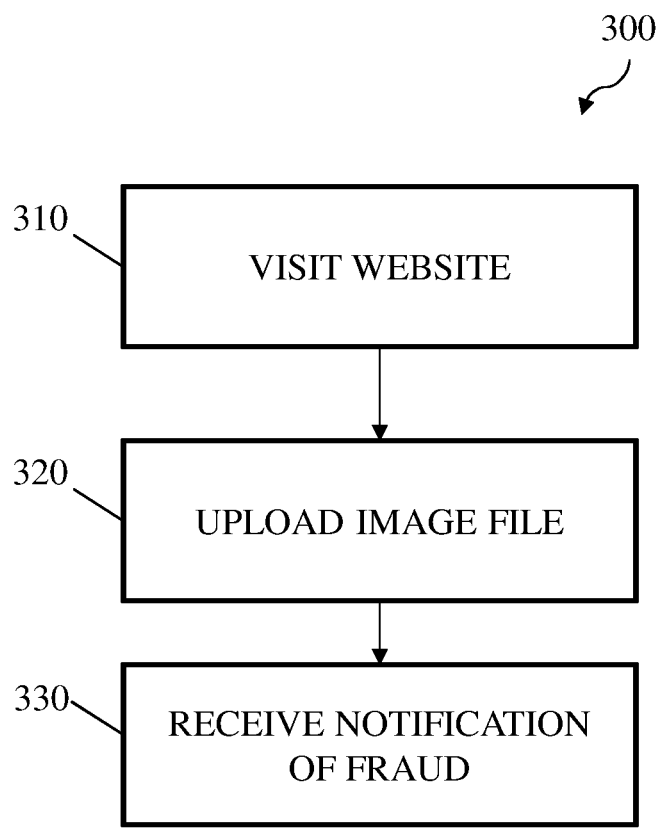
FIG. 3 is a flowchart showing a method of fraud protection with a website, according to some embodiments of the present disclosure.

FIG. 3 is a flowchart showing a method of fraud protection 300 with a website, according to some embodiments of the present disclosure. At step 310, a webserver may be configured to provide a website for the user to access. In some embodiments, the website may be a website of a financial institution, such as the Capital One® website. In some embodiments, the website may be configured to require the user to register and login with valid credentials, so that it may provide the user with direct services. In some embodiments, the website may be configured to not require login, so that it may act as a platform for the user to send communications and upload files.

At step 320, the website may be configured to instruct the user to upload one or more image files of a mail or an email in question. In some embodiments, a link to a fraud protection function on the website may be configured to direct the user to a file upload interface where the user may select and upload image files.

At step 330, after the webserver associated with the website calculates a confidence level of fraud based on the uploaded one or more image files, the website may be configured to display a notification to the user. For example, the notification may be "Alert! The mail is 70% likely to be a fraud." The notification may also be "Don't worry. The mail is not likely to be a fraud."

Figure 4:
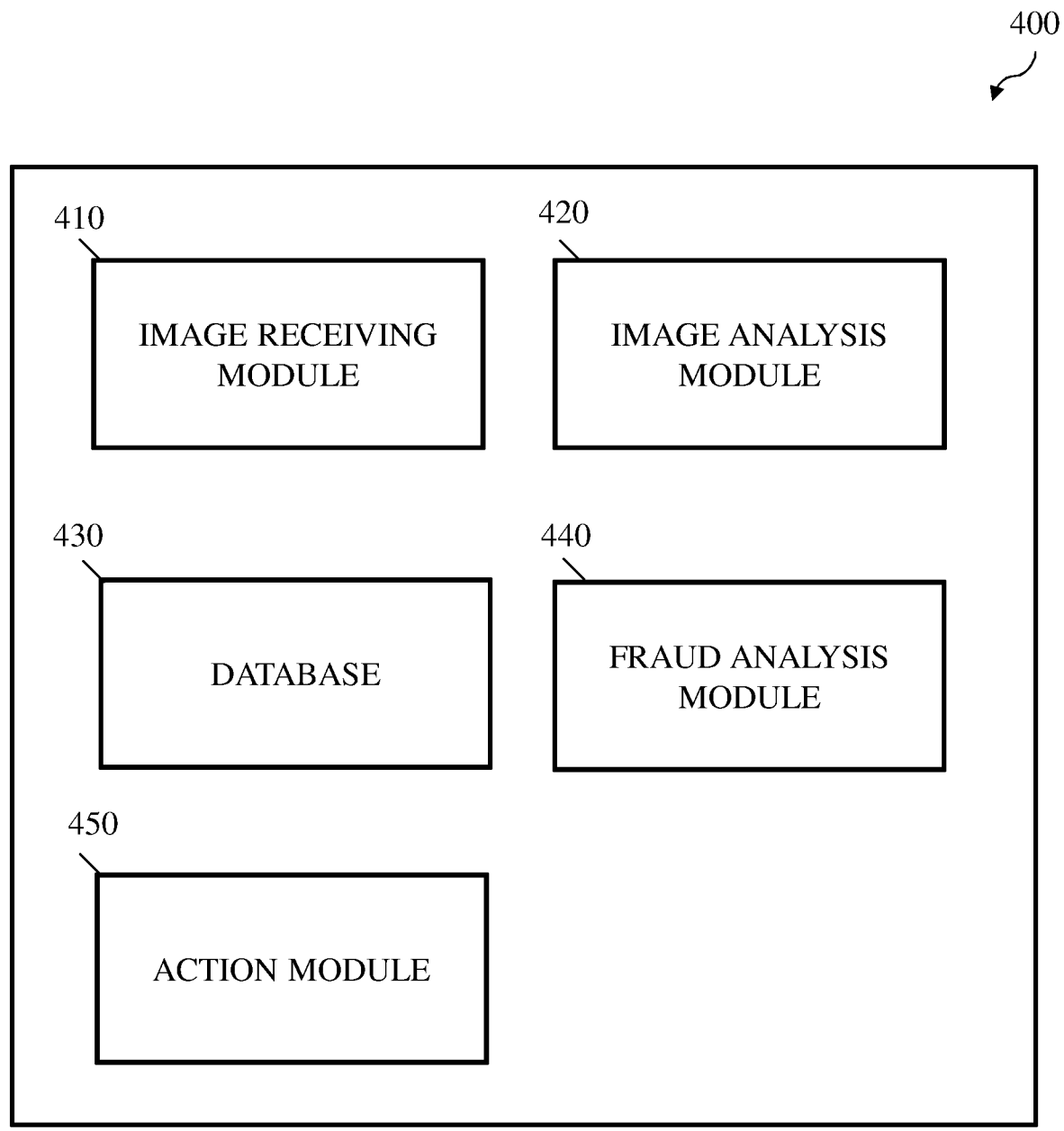
FIG. 4 is a block diagram showing different modules within a server, according to some embodiments of the present disclosure.

FIG. 4 shows different modules within a server 400, according to some embodiments of the present disclosure. In some embodiments, the server 400 may be configured to include an image receiving module 410, an image analysis module 420, a database 430, a fraud analysis module 440, and an action module 450. In some embodiments, instead of being a single server, the server 400 may include a set of servers that in tandem include one or more of the mentioned modules. In some embodiments, one or more of the mentioned modules may be implemented with a group of servers. In some embodiments, one or more of the mentioned modules may be implemented with executable instructions, or with special purpose hardware, or combinations of both. For example, the image receiving module 410, the image analysis module 420, the fraud analysis module 440 and the action module 450 may include executable computer programs based on a computer programming language, such as Python™. In another example, the image receiving module 410, the image analysis module 420, the fraud analysis module 440 and the action module 450 may be implemented with hardware circuit, such as field-programmable gate array (FPGA), or application-specific integrated circuit (ASIC). The database 430 may be implemented with commercial software such as the Oracle® database, or with open source software such as the Apache® project.

The image receiving module 410 may be configured to communicate with a mobile device and receive one or more image files from the mobile device. In some embodiments, the image receiving module 410 may be configured to accept an image file in different formats, such as JPEG, PNG, GIF, TIFF, BMP, etc. In some embodiments, the image receiving module 410 may be configured to check whether or not the received image file is corrupted. If it is determined that the file is damaged, the image receiving module 410 may be configured to notify the user and ask for a replacement image file.

The image analysis module 420 may be configured to extract text and/or one or more figures from the received image file. In some embodiments, the image analysis module 420 may be configured to use optical character recognition (OCR) techniques to extract text from the image file. In some embodiments, the image analysis module 420 may be configured to isolate one or more figures from the image file. For example, the one or more figures may include a logo, a signature, a photo, etc.

The database 430 may be configured to store pre-defined fraud-related information. In some embodiments, the database 430 may be configured to store one or more keywords or phrases and a corresponding likelihood of fraud. For example, a certain phone number may be pre-determined to be associated with a known fraud. Thus, the database 430 may be configured to store this phone number and a likelihood of fraud of 100% for this phone number. In some embodiments, a certain arrangement of distinct keywords may be related to a potential fraud. For example, groupings or combinations of keywords, or keywords of a certain frequency may be contributing factors to a calculation of a confidence level of fraud. In some embodiments, the presence of a specific keyword may trigger additional analysis. For example, a first screening may indicate the text contains a particular keyword, which may lead to a second screening using additional criterion. In some embodiments, the database 430 may be configured to store contact and identity information associated with one or more legitimate entities. For example, the database 430 may be configured to store a verified mailing address and a genuine logo of a legitimate company.

The fraud analysis module 440 may be configured to calculate a confidence level of fraud based on the extracted text and/or figures. In some embodiments, the fraud analysis module 440 may be configured to search the extracted text and compare it to one or more pre-defined keywords with high likelihood of fraud stored in the database 430. For example, the fraud analysis module 440 may be configured to determine whether any text matches a known fraudulent phone number. In some embodiments, the fraud analysis module 440 may be configured to compare one or more isolated figures from the image file to a legitimate figure stored in the database 430. For example, the fraud analysis module 440 may be configured to compare a company logo appearing in the mail to a genuine company logo stored in the database 430. In some embodiments, the fraud analysis module 440 may be configured to send a request to an external source and obtain information relevant to the extracted text and/or figures. It may then determine a validity of the extracted text and/or figures based on the obtained information. For example, a particular item of mail may inform the user of an award from a class-action lawsuit. The fraud analysis module 440 may then communicate with an external source (e.g., the Internet) to verify the information in this particular mailing and/or create one or prompts to the user to help the user determine whether the user is even part of the class. In some embodiments, the fraud analysis module 440 may be configured to check the transaction history associated with the user to determine if the user is involved in the matter claimed in the mailing or the email. For example, if it is determined that the subject of the class-action lawsuit is a particular product, the fraud analysis module 440 may determine if the user has ever purchased the product based on the transaction history.

In some embodiments, the fraud analysis module 440 may be trained with a machine learning algorithm. For example, the fraud analysis module 440 may first receive human inputs on the presence of fraud schemes for a large number of mails and/or emails. Then the fraud analysis module 440 may create an algorithm with machine learning techniques as it learns from the human inputs. Once the algorithm is implemented, the fraud analysis module 440 may determine one or more fraud vectors from the extracted text and/or figures to be checked and return a calculated confidence level.

The action module 450 may be configured to perform a pre-defined action in response to the determined confidence level of fraud. In some embodiments, the action module 450 may be configured to send a message containing the determined confidence level of fraud to a mobile device used by the user, or display a notification on a website used by the user. For example, the user may receive a message such as "There is a 80% chance of this mail being a fraud." In some embodiments, if it is determined that the user has initiated a high risk transaction based on the information provided in the mail or the email in question, the action module 450 may be configured to perform a more proactive action, such as placing a flag on an account of the user, or even freezing an account of the user. For example, if the confidence level of fraud exceeds a threshold value, there may be a prompt where the user is asked if he or she has initiated or performed any transaction related to the mail or the email in question which may jeopardize his or her account. If yes, the action module 450 may be configured to place a flag on the account or even freeze the account.

Figure 5:
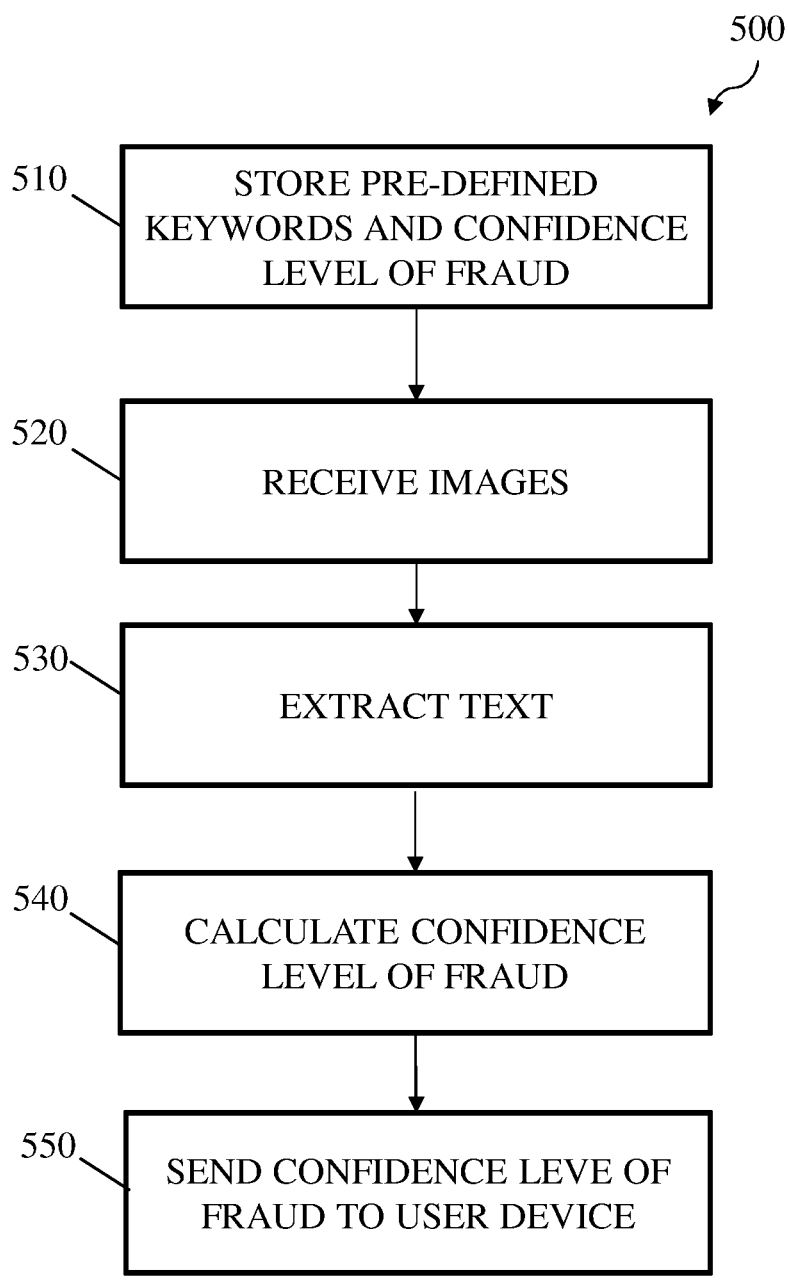
FIG. 5 is a flowchart showing a method of fraud protection with a server, according to some embodiments of the present disclosure.

FIG. 5 is a flowchart showing a method of fraud protection 500 with a server, according to some embodiments of the present disclosure. At step 510, one or more pre-defined keywords and a corresponding confidence level of fraud may be stored in the database 430. For example, a certain phone number may be pre-determined to be associated with a known fraud. Thus, the database 430 may be configured to store this phone number and a confidence level of fraud of 100% for this phone number. In some embodiments, the database 430 may be configured to store information associated with one or more legitimate entities. For example, the database 430 may be configured to store the mailing address and genuine logo of a legitimate company. In some embodiments, an administrator of the system may enter the keywords and store them in the database 430. For example, a fraud protection unit at a financial institution may compile a list of known or suspected frauds and relevant keywords and the administrator of the system may enter them into the database 430. In some embodiments, the system may obtain information from an external source (e.g., the Internet) and perform machine learning to determine one or more fraud-related keywords and store them in the database 430. In some embodiments, a fraud analysis model may be stored in the database 430. The fraud analysis model may be developed with machine learning techniques based on a large number of mails or emails, each of which may be identified as either fraudulent or legitimate by human instructions.

In some embodiments, crowdsourcing may be used to collect keywords associated with fraud. For example, the system may be configured to collect fraud information from multiple sources. In some embodiments, one or more users may report a suspected or known fraud to the system. The system may store relevant keywords from the user reported fraud in the database 430 and assign a likelihood of fraud. If it is a known scam, the likelihood of fraud may be 100%. If it has not been verified, the likelihood of fraud may be determined based on the number of users reporting. In some embodiment, the system may be configured to receive fraud information from another financial institution, a government regulatory agency, or a law enforcement agency. In some embodiments, the system may be configured to continuously update the fraud information stored in the database 430 based on received information from users. In some embodiments, the fraud analysis model stored in the database 430 may be updated with the received crowdsourced information. For example, the crowdsourced user inputs may act as additional human teachings to the system for it to further adjust the fraud analysis model.

At step 520, the image receiving module 410 may be configured to receive one or more image files from a user. In some embodiments, the image receiving module 410 may be configured to accept an image file in different formats, such as JPEG, PNG, GIF, TIFF, BMP, etc. In some embodiments, the image receiving module 410 may be configured to check whether or not the received image file is corrupted. If it is determined that the file is damaged, the image receiving module 410 may be configured to notify the user and ask for a replacement image file. In some embodiments, the image file may be uploaded by the user with a mobile device. In some embodiments, the image file may be uploaded by the user through a website. In some embodiments, the image file may be scraped from a user's electronic messaging account. For example, in some embodiments, a user may receive electronic communications including images of physical mail pieces prior to or in association with actual mail delivery. In some embodiments, access may be granted to the user's messaging account, from which image receiving module 410 may be configured to obtain the images. In some embodiments, image receiving module 410 may receive one or more image files from a third party service (e.g. a distribution service) prior to a mail piece being delivered or based on the mail piece being processed in a distribution channel.

At step 530, the image analysis module 420 may be configured to extract text and/or one or more figures from the received image file. For example, the image analysis module 420 may be configured to use optical character recognition (OCR) techniques to extract text from the image file. In some embodiments, the image analysis module 420 may be configured to isolate one or more figures from the image file. For example, the one or more figures may include a logo, a signature, a photo, etc. In some embodiments, the image analysis module 420 may be configured to parse the extract text and store different parts in different categories. For example, the name and address of the sender of the mail may be labeled as "sender entity."

At step 540, the fraud analysis module 440 may be configured to calculate a confidence level of fraud based on the extracted text and/or figures. In some embodiments, the fraud analysis module 440 may identify the most relevant aspect of the mail or email for determining fraud. For example, the validity of the sender information on the envelope of the mail or the header information of the email may be verified first. For example, the fraud analysis module 440 may check if the sender's name, physical address, or email address are legitimate. In some embodiments, the fraud analysis module 440 may be configured to compare one or more isolated figures from the image file to one or more legitimate figures stored in the database 430. For example, the fraud analysis module may be configured to compare a company logo appearing in the mail to a genuine company logo stored in the database 430.

In some embodiments, the fraud analysis module 440 may be configured to search the extracted text and compare it to one or more pre-defined keywords stored in the database 430, whereas the one or more pre-defined keywords correspond to high confidence level of fraud. For example, the fraud analysis module 440 may be configured to determine whether any text matches a known fraudulent phone number. In some embodiments, the fraud analysis module 440 may be configured to send a request to an external source and obtain information relevant to the extracted text and/or figures. Then fraud analysis module 440 may be configured to determine a validity of the extracted text and/or figures based on the obtained information. For example, the mail may inform the user of an award from a class-action lawsuit. The fraud analysis module 440 may then communicate with an external source (e.g., the Internet) to verify the information in the mail. In some embodiments, the fraud analysis module 440 may be configured to calculate a confidence level of fraud using a fraud analysis model developed based on machine learning techniques applied to a captured image or subsets of the image.

In some embodiments, the fraud analysis module 440 may be configured to evaluate the characteristic of a potential fraud. For example, an exaggerated warning, or a call to action to do something risky (e.g., investment) may be characteristics of a potential fraud. In some embodiments, the fraud analysis model may include the characteristics of a potential fraud, and may be updated with machine learning techniques.

At step 550, the action module 450 may be configured to send an indication of the determined confidence level of fraud to a user device. In some embodiments, the action module 450 may be configured to display a notification on a website used by user. For example, the user may receive a message such as "There is a 80% chance of this mail being a fraud."

Figure 6:
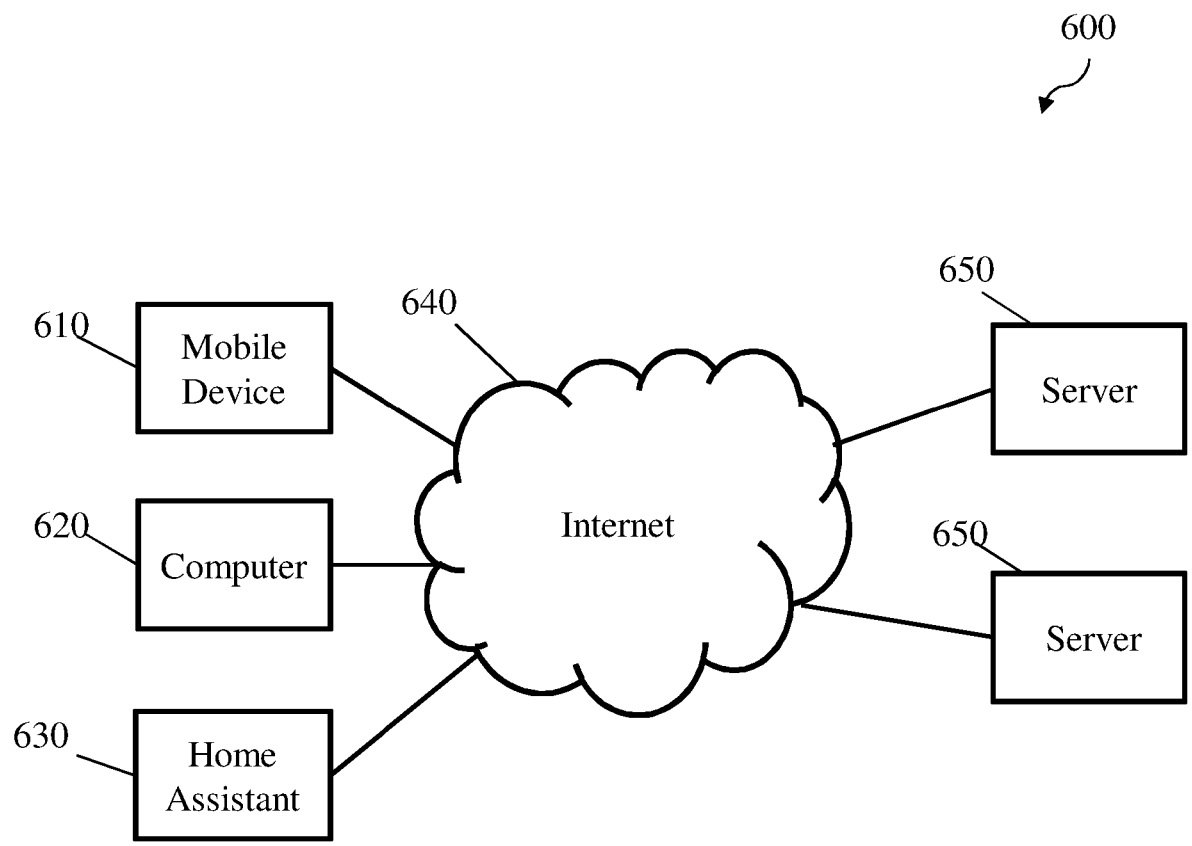
FIG. 6 is a system diagram showing connections between a user device and a server, according to some embodiments of the present disclosure.

FIG. 6 is a system diagram 600 showing connections between a user device and a server, according to some embodiments of the present disclosure. The server 650 may be configured connect to the Internet and communicate with various user devices, such as the mobile device 610, the computer 620, or the home assistant device 630. In some embodiments, the mobile device 610 may be configured to connect to the Internet through a communication module within the mobile device, such as the communication module 150 shown in FIG. 1. In some embodiments, the communication module may include one or more cellular communication interfaces, such as a 4G Long-Term Evolution (LTE) interface. In some embodiments, the communication module may include a Wi-Fi interface configured to connect and communicate with a Wi-Fi network.

In some embodiments, the computer 620 may be configured to connect to the Internet through a local area network (LAN) interface, or a wide area network (WAN) interface. For example, the computer 620 may be configured to connect to a cable modem through a LAN interface and access to the Internet. In some embodiments, the computer 620 may be configured to connect to the Internet through a Wi-Fi interface.

In some embodiments, the home assistant device 630 may be configured to connect to the Internet through a LAN, a WAN or a Wi-Fi interface. For example, the home assistant device 630 may be configured to connect to a Wi-Fi access point through a Wi-Fi adapter and access to the Internet.

Figure 7:
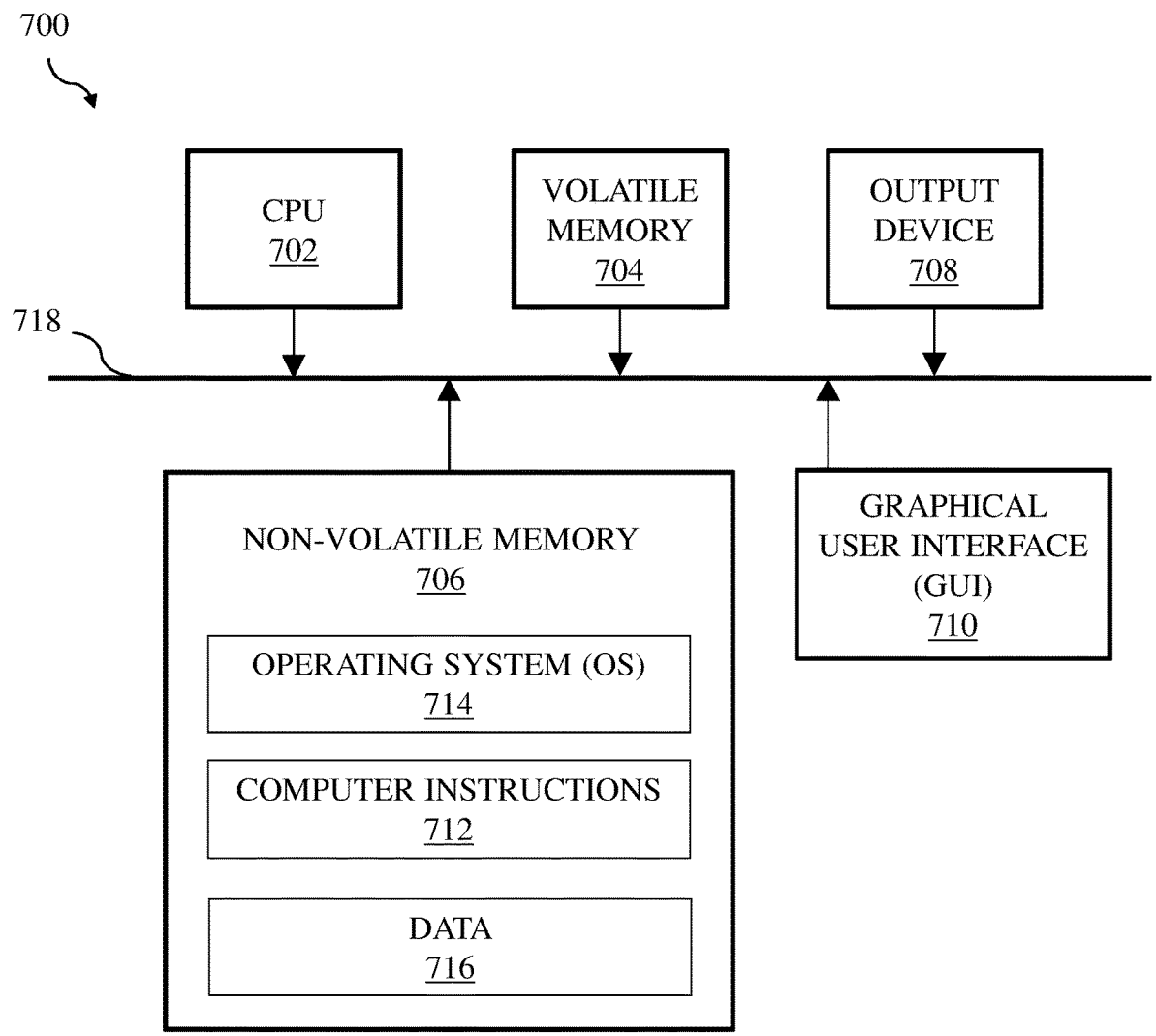
FIG. 7 is a block diagram showing a computing device and its components, according some embodiments of the present disclosure.

FIG. 7 shows an illustrative computer 700 that may perform at least part of the processing described herein, according to an embodiment of the disclosure. In some embodiments, the server 650, the mobile device 610, the computer 620, or the home assistant 630 of FIG. 6 may include the computer 700, or otherwise forms a portion of the computer 700. The computer 700 may include a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 may be configured to store computer instructions 712, an operating system 714, and data 716. In one example, the computer instructions 712 are executed by the processor 702 out of volatile memory 704. In some embodiments, the computer 700 corresponds to a virtual machine (VM). In other embodiments, the computer 700 corresponds to a physical computer.

Referring again to FIG. 7, processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system may perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Additionally, the software included as part of the concepts, structures, and techniques sought to be protected herein may be embodied in a computer program product that includes a computer-readable storage medium. For example, such a computer-readable storage medium may include a computer-readable memory device, such as a hard drive device, a CD-ROM, a DVD-ROM, or a computer diskette, having computer-readable program code segments stored thereon. In contrast, a computer-readable transmission medium may include a communications link, either optical, wired, or wireless, having program code segments carried thereon as digital or analog signals. A non-transitory machine-readable medium may include but is not limited to a hard drive, compact disc, flash memory, non-volatile memory, volatile memory, magnetic diskette and so forth but does not include a transitory signal per se.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

What is claimed is:

1. A computer-implemented method of fraud protection, comprising:

obtaining an image of a physical document or of a physical screen displaying an electronic communication, wherein the physical document comprises at least one of a written communication or a printed communication;

sending the image to a server, wherein the server is configured to:

extract at least one of graphics and text from the image, the text being extracted using optical character recognition;

compare the extracted text to a database of keywords, wherein each keyword has an associated likelihood of fraud determined via a machine learning algorithm trained on instances of known fraud obtained from at least one database comprising indicators of fraud determined by at least one of a financial institution, a government agency, a law enforcement agency, or a regulatory agency;

determine at least one word from the extracted text that matches a keyword in the database;

calculate, by the machine learning algorithm, a confidence level of fraud for the physical document or the electronic communication based on the associated likelihood of fraud of the at least one determined word that matches and a frequency of appearance in the image of the at least one determined word that matches; and in response to calculating a confidence level of fraud higher than a pre-defined threshold, communicate an indication to display a notification through a user interface of a user device associated with a user;

receiving the indication of the confidence level of fraud from the server; and presenting for display, the notification in the user interface.

2. The method of claim 1, wherein obtaining the image comprises using an image capturing device associated with a user device.

3. The method of claim 1, wherein obtaining the image comprises receiving an image file from a user.

4. The method of claim 1, wherein obtaining the image comprises taking a screenshot with a user device.

5. The method of claim 1, wherein the user device comprises at least one of a mobile device, a computer, a home appliance, or a home assistant device.

6. The method of claim 1, wherein the image is obtained from an electronic message extracted from an electronic messaging account associated with the user.

7. The method of claim 1, wherein the threshold is between 50% and 100%.

8. The method of claim 1, wherein the server is configured to provide, for display on the user interface, instructions that direct the user to send additional images of the physical document or the physical screen.

9. The method of claim 1, wherein the notification comprises at least one of:

information about a subject and a sender of the physical document or the electronic communication; or a link that, when visited by the user, displays information about the subject and the sender of the physical document or the electronic communication.

10. A computer-implemented method of fraud protection, comprising:

obtaining, by a server, an image of a physical document or of a physical screen displaying an electronic communication, wherein the physical document comprises at least one of a written communication or a printed communication;

extracting, by the server, at least one of graphics and text from the image, the text being extracted using optical character recognition;

comparing, by the server, the extracted text to a database of keywords, wherein each keyword has an associated likelihood of fraud determined via a machine learning algorithm trained on instances of known fraud obtained from at least one database comprising indicators of fraud determined by at least one of a financial institution, a government agency, a law enforcement agency, or a regulatory agency;

determining, by the server, at least one word from the extracted text that matches a keyword in the database;

calculating, by the machine learning algorithm, a confidence level of fraud for the physical document based on the associated likelihood of fraud of the at least one determined word that matches and a frequency of appearance in the image of the at least one determined word that matches; and in response to calculating a confidence level of fraud below a pre-defined threshold, communicating, by the server, an indication to display a recommendation for a user through a user interface of a user device associated with the user.

11. The method of claim 10, comprising:

receiving one or more reports of potential fraud from one or more users; and updating the database of keywords and the likelihood of fraud associated with each keyword based on the received one or more reports.

12. The method of claim 10, wherein the extracted graphics comprise at least one of a logo, a trademark, or a signature.

13. The method of claim 10, comprising:

obtaining a name of a sender from the extracted text;

receiving a first group of contact information associated with the name of the sender from an external source, wherein the first group of contact information comprises at least one of a postal address, a physical address, a phone number, or an email address;

obtaining a second group of contact information of the sender from the extracted text, wherein the second group of contact information comprises at least one of a postal address, a physical address, a phone number, or an email address;

comparing the second group of contact information to the first group of contact information; and updating the confidence level of fraud based on comparing the second group of contact information to the first group of contact information.

14. The method of claim 10, wherein the recommendation comprises information about the physical document or the electronic communication obtained from at least one other user.

15. The method of claim 10, wherein the recommendation comprises a financial offer related to the physical document or the electronic communication from another entity.

16. The method of claim 10, wherein the server is configured to provide, for display on the user interface, instructions that direct the user to send additional images of the physical document or the electronic communication.

17. A system of fraud protection, comprising:

a memory; and a processor circuit coupled to the memory and configured to executive instructions causing the processor circuit to:

obtain, by a server an image of a physical document or of a physical screen displaying an electronic communication, wherein the physical document comprises at least one of a written communication or a printed communication;

extract, by the server, at least one of graphics and text from the image, the text being extracted using optical character recognition;

compare, by the server, the extracted text to a database of keywords, wherein each keyword has an associated likelihood of fraud determined via a machine learning algorithm trained on instances of known fraud obtained from at least one database comprising indicators of fraud determined by at least one of a financial institution, a government agency, a law enforcement agency, or a regulatory agency;

determine, by the server, at least one word from the extracted text that matches a keyword in the database;

calculate, by the machine learning algorithm, a confidence level of fraud for the physical document based on the associated likelihood of fraud of the at least one determined word that matches and a frequency of appearance in the image of the at least one determined word that matches; and in response to calculating a confidence level of fraud below a pre-defined threshold, communicate, by the server, an indication to display a recommendation for a user through a user interface of a user device associated with the user.

18. The system of claim 17, comprising:

receiving one or more reports of potential fraud from one or more users; and updating the database of keywords and the likelihood of fraud associated with each keyword based on the received one or more reports.

19. The system of claim 17, wherein the extracted graphics comprise at least one of a logo, a trademark, or a signature.

20. The system of claim 17, comprising:

obtaining a name of a sender from the extracted text;

receiving a first group of contact information associated with the name of the sender from an external source, wherein the first group of contact information comprises at least one of a postal address, a physical address, a phone number, or an email address;

obtaining a second group of contact information of the sender from the extracted text, wherein the second group of contact information comprises at least one of a postal address, a physical address, a phone number, or an email address;

comparing the second group of contact information to the first group of contact information; and updating the confidence level of fraud based on comparing the second group of contact information to the first group of contact information.

* * * * *